United States Patent [19]

Hutton

[11] Patent Number: 5,041,056
[45] Date of Patent: Aug. 20, 1991

[54] CHOP CUTTING APPARATUS

[75] Inventor: Barry G. Hutton, Chinnor, United Kingdom

[73] Assignee: J. Sainsbury plc, London, United Kingdom

[21] Appl. No.: 516,333

[22] Filed: Apr. 30, 1990

[30] Foreign Application Priority Data

Apr. 28, 1989 [GB] United Kingdom ............... 8909872

[51] Int. Cl.⁵ .............................................. A22C 25/18
[52] U.S. Cl. .................................... 452/171; 452/149; 30/380; 83/788; 83/713
[58] Field of Search ............... 452/149, 171, 127, 134; 30/380; 83/788, 713, 425, 437

[56] References Cited

U.S. PATENT DOCUMENTS

| Re. 28,508 | 8/1975 | Neebel et al. | 452/171 |
| 4,208,936 | 6/1980 | Whitehouse | 83/713 |
| 4,653,151 | 3/1987 | Berdou | 452/127 |
| 4,970,755 | 11/1990 | LeBlanc | 452/149 |

FOREIGN PATENT DOCUMENTS 1209457 10/1970 United Kingdom .

Primary Examiner—Willis Little
Attorney, Agent, or Firm—Merchant & Gould, Smith, Edell, Welter & Schmidt

[57] ABSTRACT

A chop cutting apparatus comprises a cutting blade; a loin holding device mounted for reciprocal translation in a direction parallel to the plain of the cutting blade; a pusher for urging a loin along the loin holding device into the plate of the cutting blade; an abutment member on the opposite side of the cutting blade and against which the loin is urged; and a scraping device positioned to clean the chops cut from the loin. The scraping device comprises a plurality of resilient wiping fingers which extend in a direction substantially in a plane parallel to the plane of the cutting blade and angled relative to the discharge direction of the cut chops, with means for urging the cut chop into contact with said fingers so that they bear against a surface of the chop thereby cleaning it of fat, grease and other residue.

7 Claims, 5 Drawing Sheets

CHOP CUTTING APPARATUS

FIELD OF THE INVENTION

This invention relates to a chop cutting apparatus, suitable for severing chops from the carcass of an animal.

BACKGROUND TO THE INVENTION

An apparatus of this kind is described in UK Patent Specification No. 1 209 457. This apparatus comprises a cutting member in the form of a fast moving band saw and a loin holding device in which a loin of meat to be cut is placed. The loin can be pushed along the loin holding device by a member provided with a handle towards the vertical plane containing the blade. The loin holding device is mounted for translation parallel to the vertical plane of the blade so that the blade can cut part of the loin extending from the loin holding device.

This apparatus has operated satisfactorily for many years, at least for cutting frozen joints. At present, for cutting fresh loins a free standing band saw is used. The loin is first cut, using a knife, as far as the bone at intervals along the loin determining the chop width. The loin is then presented to the bandsaw with the main part of the loin and the chop to be cut pulled apart so that the band saw is used to sever the bone only. However, this practice is no longer acceptable under new Health and Safety guidelines which specify that during operation the operator's hands must not come close to the blade. The requirement that an operator's hands must be safeguarded from a moving band saw has ramifications on the quality of chop which can be produced. With a free standing band saw, the cutting area around the band saw is open and the meat does not, or only minimally, come into contact with the band saw. The surfaces of the newly cut chop are hence relatively clean and can be delivered immediately in a form suitable for packing.

If, in accordance with the new Health and Safety Guidelines the band saw is enclosed, the conventional practice of precutting the loin and then severing the bone cannot be carried out. Instead the leading and cut surfaces of the loin are forced into contact with abutment surfaces. Hence, fat, grease and bone residue is caused to adhere to the chops which renders them unsuitable for immediate packing.

It is desirable to provide chop cutting apparatus in which the band saw is enclosed but which nevertheless produces "clean" chops, i.e. chops of a quality suitable or nearly suitable for immediate packing. In this connection "quality" refers to the cleanliness of the chop and not to any inherent characteristics of the loin.

SUMMARY OF THE INVENTION

According to one aspect of the present invention there is provided a chop cutting apparatus comprising: a cutting member; a loin holding device mounted for reciprocal translation in a direction parallel to the plane of the cutting blade; means for urging a loin along the loin holding device into the plane of the cutting blade; an abutment member on the opposite side of the cutting blade and against which the loin is urged; and scraping means positioned to clean the chops cut from the loin, the scraping means comprising a plurality of resilient wiping fingers which extend in a direction substantially in a plane parallel to the plane of the cutting member and angled relative to the discharge direction of the cut chops, with means for urging the cut chop into contact with said fingers so that they bear against a surface of the chop thereby cleaning it of fat, grease and other residue.

Preferably, the fingers are slightly bent in their central region so as to bulge inwardly of the channel.

Preferably, the fingers extend at an angle of 18° to the longitudinal axis.

In the preferred embodiment the cutting member is a band saw.

Another problem arising with the requirement that the band saw be inaccessible during operation is associated with the abutment member. Preferably this is adjustable so that its distance from the cutting member can be varied to vary the width of the chop. However, to satisfy the new Health and Safety Guidelines it must not be detachable from the apparatus while the band saw is in motion.

Existing band saw machines are provided with a closure member which when closed acts as a guard for the band saw and additionally houses operating machinery for the band saw. The procedure for activating the band saw necessarily involves closure of this closure member.

According to another aspect of the present invention there is provided a chop cutting apparatus comprising: a band saw machine of the type having a closure member which guards the cutting blade, operation of the machine being inhibited unless the closure member is closed; a loin holding device mounted for reciprocal translation in a direction parallel to the plane of the cutting blade; means for urging a loin along the loin holding device into the plane of the cutting blade; an abutment member secured to a surface of the apparatus on the opposite side of the cutting blade and against which the loin is urged; and a locking mechanism for the abutment member, the locking mechanism comprising: a securement device extending through a slot in the abutment member and through said surface; a bracket secured to the closure member and having a notch for receiving said securement device; and a resilient plate secured to the apparatus so that in a first position it abuts the bracket to prevent closure of the closure member and in a second position it permits closure of the closure member, the securement device being arranged when secured to act on the resilient plate to urge it into the second position, wherein the closure member can be closed and the securement device engages the notch in the bracket.

With this arrangement, once the closure member has been closed, the securement device cannot be removed from outside the machine since it is engaged by the notch in the bracket. Hence, the abutment member cannot be removed unless the closure member is opened, which necessarily entails stopping the band saw machine, and rendering it electrically isolated.

Preferably the securement device has a release mechanism which when released enables the position of the abutment member to be adjusted without removing the securement device from the notch in the bracket. Thus, even with the release mechanism released the abutment member cannot be removed.

For a better understanding of the present invention and to show how the same may be carried into effect, reference will now be made, by way of example, to the accompanying drawings.

BRIEF DESCRIPTION OF THE DRAWINGS

FIG. 6 is a sketch showing a door locking mechanism; and

DESCRIPTION OF THE PREFERRED EMBODIMENT

Figure 1:
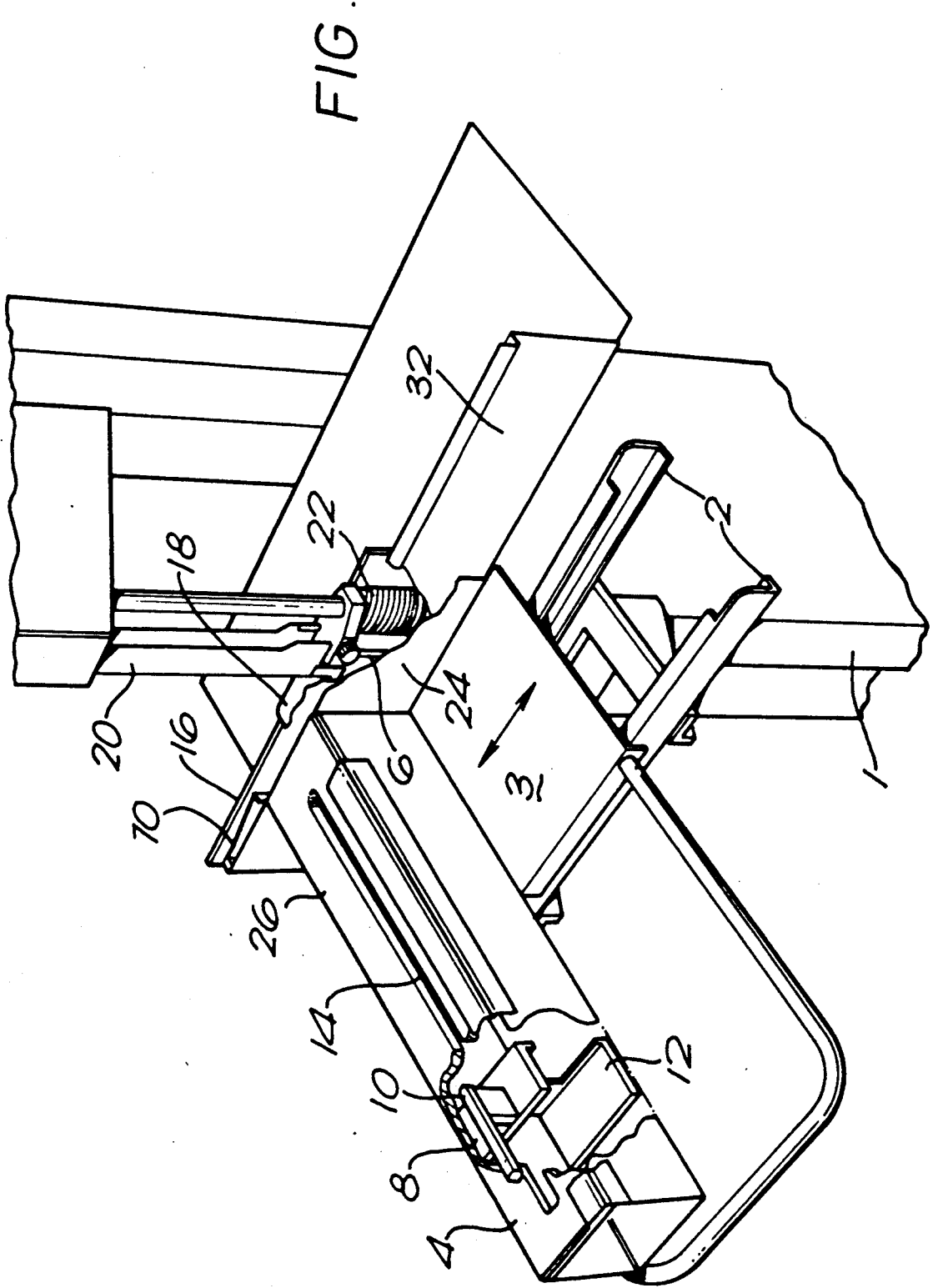
FIG. 1 is a perspective view of part of a chop cutting apparatus.
Figure 2:
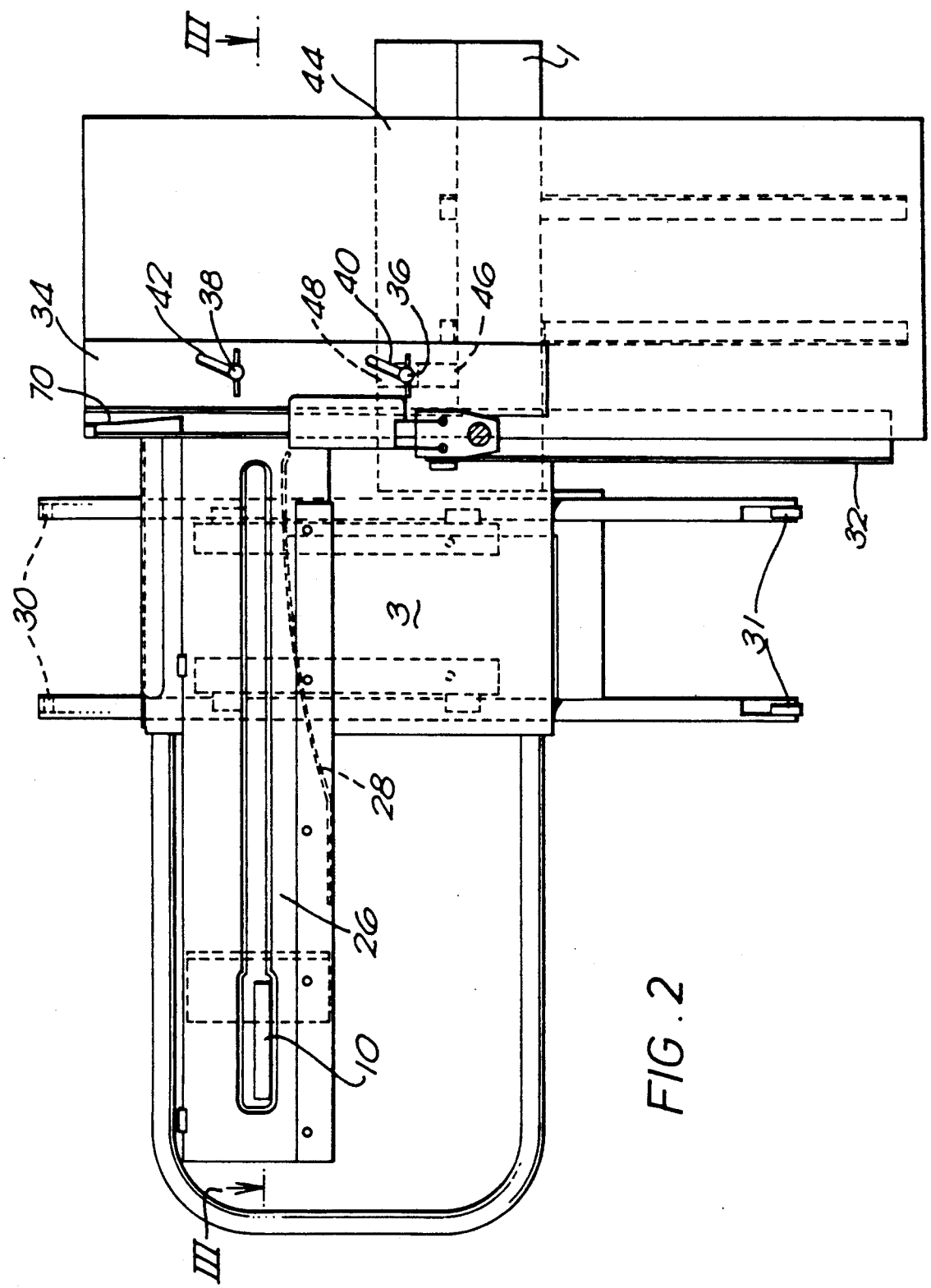
FIG. 2 is a plan view of the chop cutting apparatus.
Figure 3:
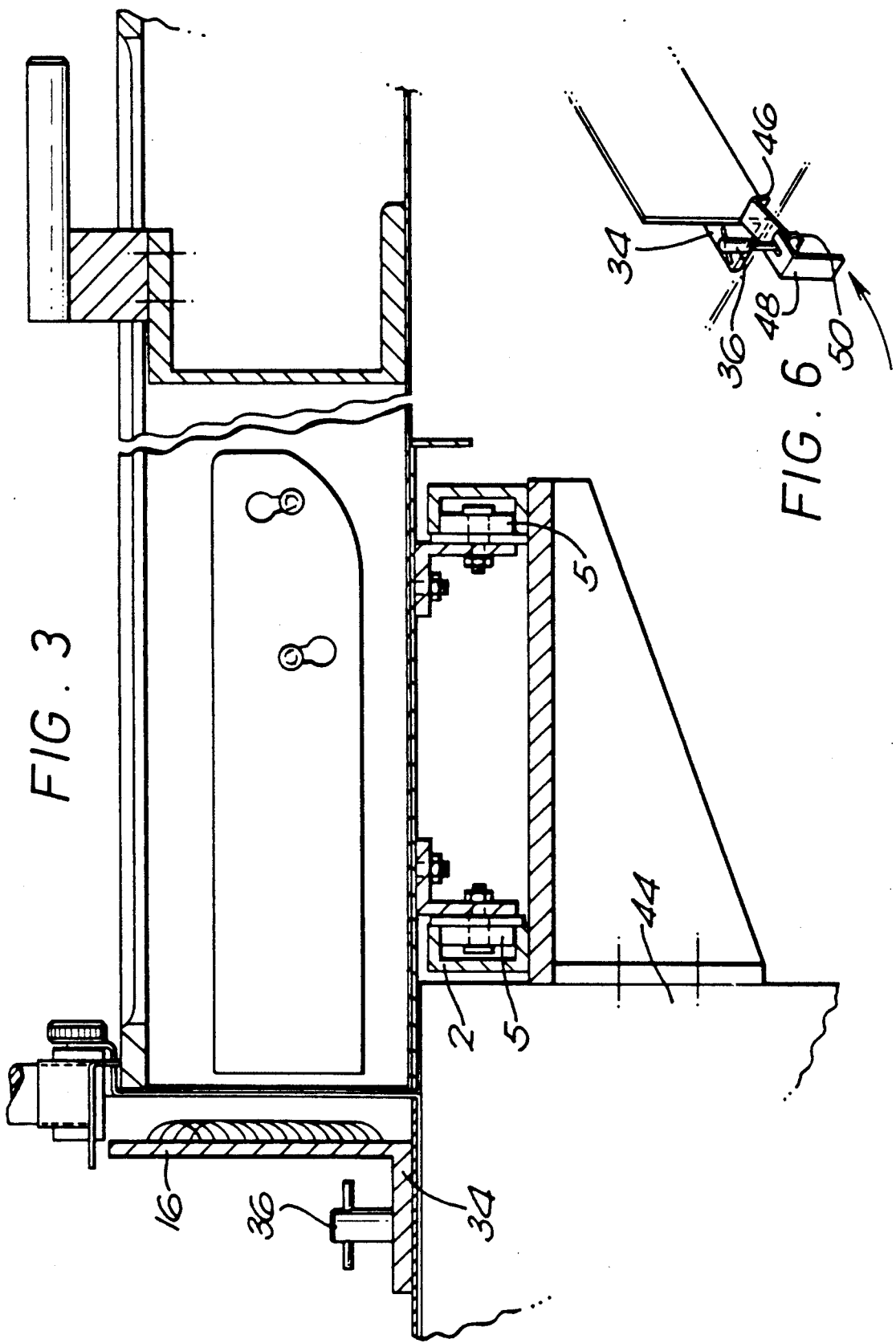
FIG. 3 is a section on line III—III of FIG. 2.

Reference is first made to FIGS. 1, 2 and 3 which show a chop cutting apparatus. The apparatus comprises a mounting 1 supporting guide tracks 2. A table 3 has rollers 5 (see FIG. 3) which engage in the guide tracks 2. Stop pins 30, 31 (see FIG. 3) are provided at the ends of the guide tracks 2 to limit the reciprocal movement of the table 3. A loin feeder 4 in the form of an enclosed tube is fixed to the table 3. In FIG. 2, reference numeral 28 designates a spring plate which urges the loin towards one side of the loin feeder 4 and helps to position it for cutting.

A cutting blade 6 is supported by the mounting 1 adjacent one end of a loin feeder 4 in the path of a loin disposed in and projecting from the feeder 4. The blade is a fast moving bandsaw, travelling at for example 3000 cm per second. A pushing device 8 is mounted in the loin feeder 4. The pushing device 8 has a handle 10 and otherwise comprises a bracket 12 mounted for sliding movement in the loin feeder 4. The loin feeder 4 is illustrated partly cut away to show the pushing device 8. A slot 14 to permit movement of the handle 10 is formed in a cover 26 of the loin feeder 4. The provision of a loin feeder which encloses the loin permits the operator to feed the loin without risk of his hands contacting the blade 6.

An abutment plate 16 is supported on the mounting 1. The surface of the loin protruding from the loin feeder 4 is urged against this plate 16. The distance of the abutment plate 16 from the blade 6 determines the thickness of the chop to be cut. The abutment plate 16 extends behind the blade 6 so that the latter is inaccessible when the abutment plate 16 is in position. In addition, there is a guard 18, partially shown in FIG. 1, which extends over the channel formed between the abutment plate 16 and the end of the loin feeder 4. A blade guard 20 extends vertically around the blade.

The Health & Safety Guidelines require that no part of the blade 6 can be accessible to an operator during operation. This means that the conventional practice for cutting chops described earlier cannot be utilised. Instead the loin feeder 4 is reciprocally translated while the loin is urged towards the abutment plate and into the path of the blade. The leading surface of the loin, and to a lesser extent the cut surface of the chop, are hence prone to the build up of dust, fat, grease, bits of bone etc. Chops delivered in this state would not be satisfactory in terms of consumer quality. To overcome this, a scraper device 22 is positioned just downstream of the cutting blade 6 in discharge channel formed by an extension of the plate 16 and facing plates 24, 32 which extend vertically from the table 3 and which additionally help to protect an operator from the blade. It has proved very difficult to devise a satisfactory scraper device. A rigid scraper proved to be unsatisfactory because it was not capable of coping with various contours of the cut chop to allow for different bone variations. A scraper device having very short parallel fingers (1 cm or so) similarly turned out to be unsatisfactory because, instead of just cleaning the chop, they scraped meat off the bone.

Figure 4:
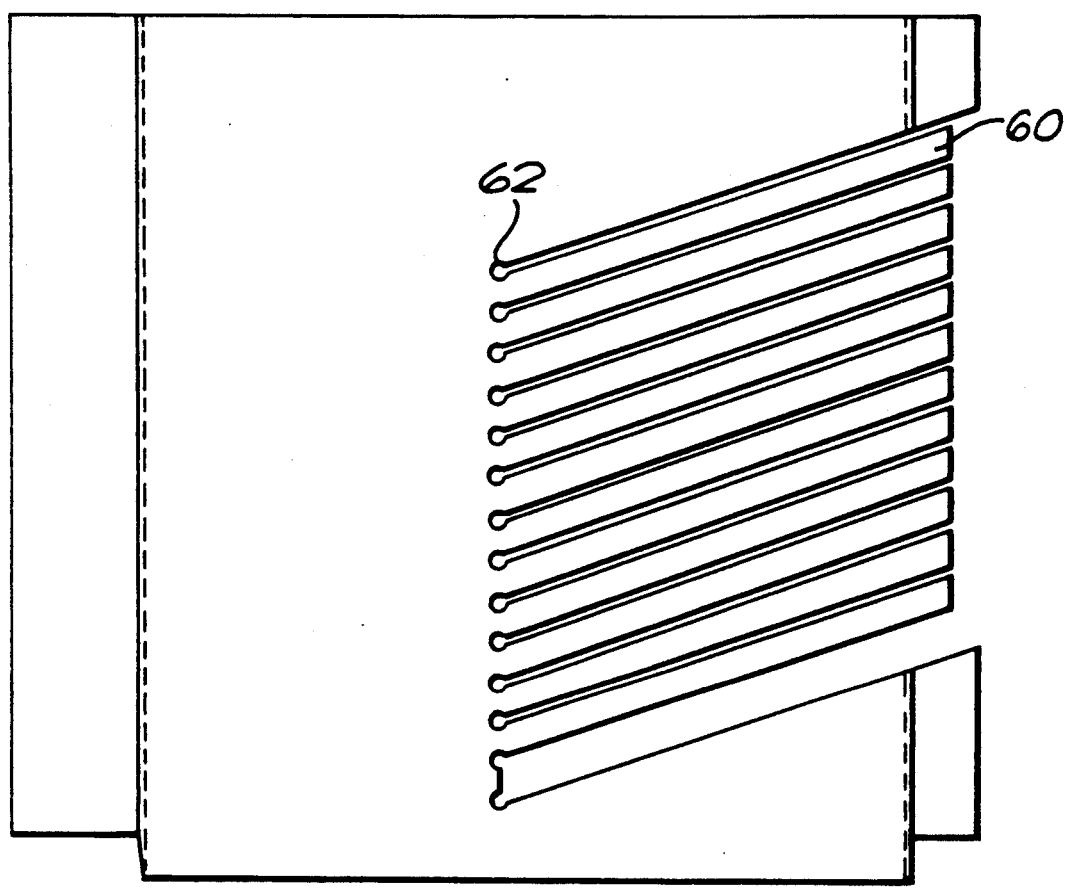
FIG. 4 is a side view of a scraper device.
Figure 5:
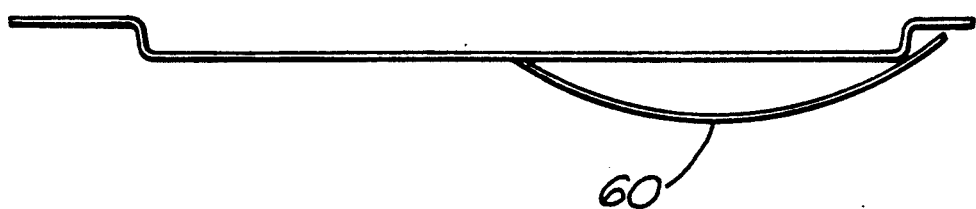
FIG. 5 is a top view of the scraper device of FIG. 6.

The present inventors have however now devised a satisfactory solution in the form of a plurality of elongate resilient fingers as illustrated in FIGS. 4 and 5. In the embodiment illustrated in FIGS. 4 and 5, the scraper device comprises twelve resilient elongate fingers 60 which, as can be seen more clearly in FIG. 5, are bent inwardly. The fingers 60 extend at an angle of 18° 30′ from the horizontal, and although this angle can be varied within certain limits it has been found that this angle provides optimum chop cleaning. Each finger is approximately 7 cm long, and they are spaced a distance of 1.6 mm apart. The fingers are bent about the arc of a circle of radius, 70 mm (see FIG. 5). The loin feeder 4 carries means for urging the cut chops into contact with the fingers in the form of a resilient plate 70. The stop pins 31 are positioned so that at the end of its travel, the table 3 brings the resilient plate 70 in a position to face the fingers 60. The resilient plate 70 prevents chops piling up in the vicinity of the blade. It also plays a part in supporting the overlapping part of the loin during its passage through the blade. As the chop is forced past the fingers 60, it is cleaned of any fat, grease, bits of bone etc. from the chop so that it requires no further cleaning treatment before it is packed. It is important to provide for the escape of the fat and grease etc. which is being cleaned off the chop, and to this end a plurality of holes 62 are provided at the base of the fingers 60 through which this fat and grease can be forced. In addition, the fact that the fingers are bent permits fat to flow behind the fingers. Further, the fingers are permitted to move over one another slightly to provide flexibility and to adapt to different contours of the chop. Although not shown in the drawings, it is envisaged that the ends of the fingers could be tapered to further facilitate such movement. It is also envisaged that a further cleaning device could be placed on the facing plate 32 to clean the newly cut side of the chop. This would take the form of a similar device to that shown in FIGS. 4 and 5 or could merely be an angled slot.

Figure 7:
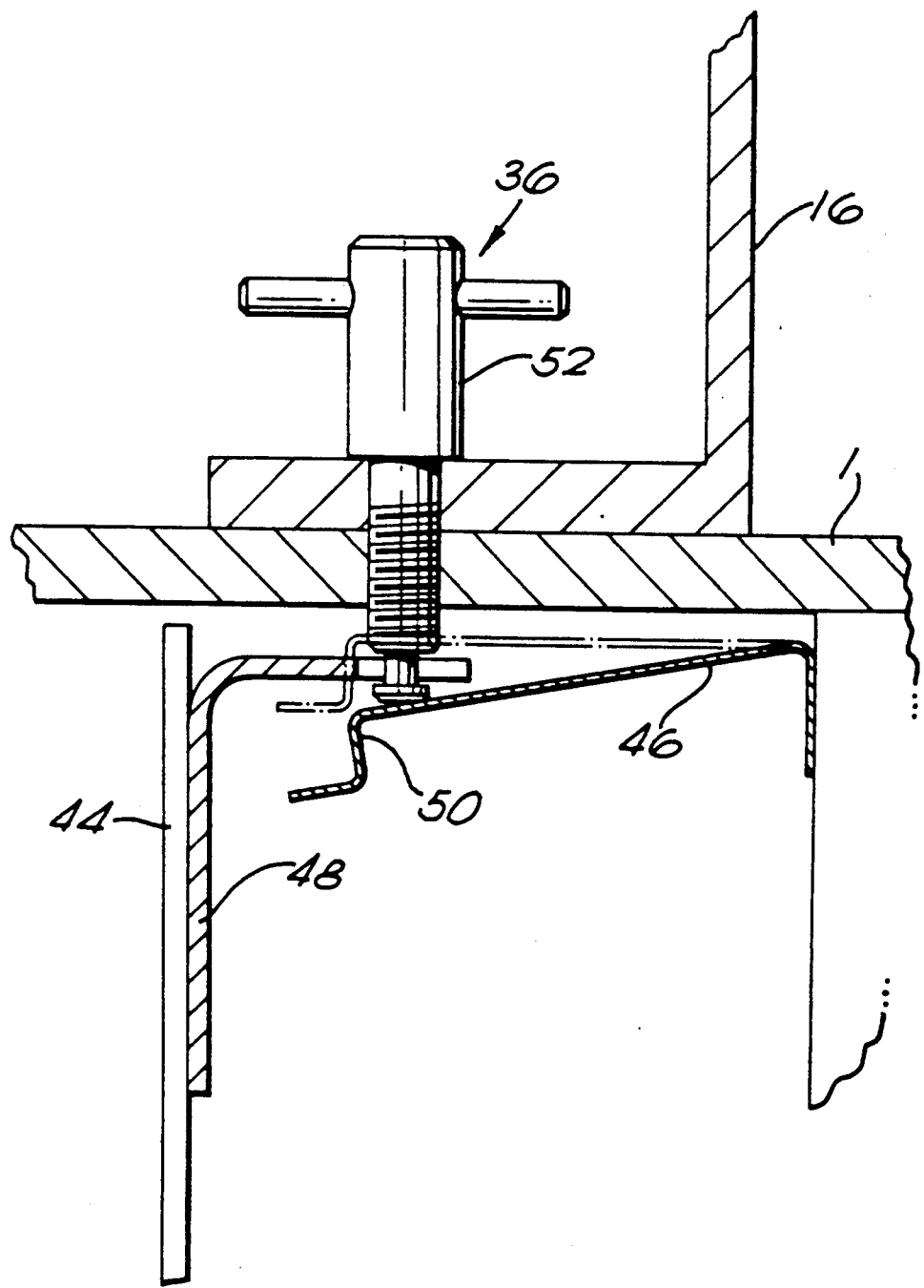
FIG. 7 is a section through a locking mechanism

Referring again to FIGS. 1 to 3, the abutment plate 16 should preferably be adjustable to enable the size of the chops to be cut to be preselected. However, it is a requirement of the new Health and Safety regulations that it is not possible to remove the abutment plate 6 while the band saw is operating. The provision of an electrical sensing device to issue a warning signal if an attempt is made to remove the abutment plate during use has been considered by the inventors but has been rejected on the grounds of complexity and cost. Instead, the inventor has devised a mechanical solution as will now be described with particular reference to FIGS. 6 and 7. The abutment plate 16 consists of an angle piece as shown most clearly in the cross-section of FIG. 3. The horizontal leg 34 of the angle piece is secured to a fixed surface of the machine by two securement devices in the form of bolts 36, 38 co-operating respectively with two angled slots 40, 42 in the horizontal leg 34 of the angle piece. For the purposes of the following description the bolt 36 will be referred to as a captive screw and the bolt 38 will be referred to as a fixing screw. The band saw is equipped with a door 44 which when open reveals the band saw drive enclosure housing the drive mechanism for the band saw. As is known, on existing band saws, e.g. the AEW 350, for safety reasons the band saw cannot be operated with the door 44 in the open position. Use has been made of this fact to devise a locking mechanism to ensure that the abutment plate 16 cannot be moved unless the door 44 has been opened. As can best be seen in FIG. 7 the locking mechanism comprises, with the captive screw 36, a resilient plate 46 secured to the inner rear wall of the band saw drive enclosure and an L-shaped bracket 48 secured to the inner face of the door 44. The resilient plate 46 has a depending flange 50. The captive screw 36 extends through the angle slot 40 and acts on the resilient plate 46. The bracket 48 has a notch 50 in its horizontal flange for engaging the captive screw 36. In the absence of the captive screw 36 the resilient plate 46 adopts a horizontal position as indicated in the dotted lines in FIG. 7. In this position the door 44 is prevented from closing by the bracket 48 in co-operation with the depending flange 50 of the resilient plate 46. Before the door 44 can be closed, the resilient plate 46 must be depressed by inserting the captive screw 36 through the angle slot 40 and through the surface 1 of the machine so that it pushes the resilient plate 46 downwards until it is clear of the bracket 48 attached to the door 44. In this position, the door can be closed. Furthermore, the notch 50 in the bracket 48 will engage the screw 36 so that the screw 36 cannot be removed while the door 44 is closed. The captive screw 36 has a release mechanism in the form of a spring-loaded cap 52. The position of the abutment plate 16 can be adjusted by releasing the cap 52 of the screw 36, moving the abutment plate 16 and then securing the cap 52 again. However, the plate 16 cannot be removed unless the door 44 is opened. Hence the safety guidelines are satisfied in a simple and effective manner.

What is claimed is:

1. A chop cutting apparatus comprising: a cutting blade; a loin holding device mounted for reciprocal translation in a direction parallel to the plane of the cutting blade; means for urging a loin along the loin holding device into the plane of the cutting blade; an abutment member on the opposite side of the cutting blade and against which the loin is urged; and scraping means positioned to clean the chops cut from the loin, the scraping means comprising a plurality of resilient wiping fingers which extend in a direction substantially in a plane parallel to the plane of the cutting blade and angled relative to the discharge direction of the cut chops, with means for urging the cut chop into contact with said fingers so that they bear against a surface of the chop thereby cleaning it of fat, grease and other residue.

2. A chop cutting apparatus as claimed in claim 1, wherein the fingers are slightly bent in their central region so as to bulge inwardly towards the chop.

3. A chop cutting apparatus as claimed in claim 1, wherein the fingers extend at an angle of 18° to the longitudinal axis.

4. A chop cutting apparatus as claimed in claim 1, wherein the cutting member is a band saw.

5. A chop cutting apparatus as claimed in claim 4, wherein the band saw is of the type having a closure member which guards the cutting blade, operation of the machine being inhibited unless the closure member is closed and comprising a locking mechanism for the abutment member comprising a securement device extending through a slot in the abutment member and through a surface of the machine; a bracket secured to the closure member and having a notch for receiving said securement device; and a resilient plate secured to the apparatus so that in a first position it abuts the bracket to prevent closure of the closure member and in a second position it permits closure of the closure member, the securement device being arranged when secured to act on the resilient plate to urge it into the second position, wherein the closure member can be closed and the securement device engages the notch in the bracket.

6. A chop cutting apparatus comprising: a band saw machine of the type having a closure member which guards the cutting blade, operation of the machine being inhibited unless the closure member is closed; a loin holding device mounted for reciprocal translation in a direction parallel to the plane of the cutting blade; means for urging a loin along the loin holding device into the plane of the cutting blade; an abutment member secured to a surface of the apparatus on the opposite side of the cutting blade and against which the loin is urged; and a locking mechanism for the abutment member, the locking mechanism comprising: a securement device extending through a slot in the abutment member and through said surface; a bracket secured to the closure member and having a notch for receiving said securement device; and a resilient plate secured to the apparatus so that in a first position it abuts the bracket to prevent closure of the closure member and in a second position it permits closure of the closure member, the securement device being arranged when secured to act on the resilient plate to urge it into the second position, wherein the closure member can be closed and the securement device engages the notch in the bracket.

7. A chop cutting apparatus as claimed in claim 5 or 6, wherein the securement device has a release mechanism which when released enables the position of the abutment member to be adjusted without removing the securement device from the notch in the bracket.

* * * * *

UNITED STATES PATENT AND TRADEMARK OFFICE
CERTIFICATE OF CORRECTION

PATENT NO. : 5,041,056

DATED : 20 August 1991

INVENTOR(S) : Barry G. Hutton

It is certified that error appears in the above-identified patent and that said Letters Patent is hereby corrected as shown below:

In the abstract, line 16, please add the paragraph -- The apparatus also comprises a safety locking mechanism-- after "residue".

Signed and Sealed this

Fifth Day of January, 1993

*Attest:*

DOUGLAS B. COMER

*Attesting Officer*   Acting Commissioner of Patents and Trademarks